(12) United States Patent
Yasutomi

(10) Patent No.: US 11,513,302 B2
(45) Date of Patent: Nov. 29, 2022

(54) OPTICAL FIBER CABLE AND CABLE CORE PRODUCTION METHOD

(71) Applicant: FURUKAWA ELECTRIC CO., LTD., Tokyo (JP)

(72) Inventor: Tetsuya Yasutomi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/358,798

(22) Filed: Jun. 25, 2021

(65) Prior Publication Data

US 2021/0325620 A1 Oct. 21, 2021

Related U.S. Application Data

(63) Continuation of application No. PCT/JP2019/050575, filed on Dec. 24, 2019.

(30) Foreign Application Priority Data

Jan. 10, 2019 (JP) .............................. JP2019-002427

(51) Int. Cl.
*G02B 6/44* (2006.01)

(52) U.S. Cl.
CPC ......... *G02B 6/4434* (2013.01); *G02B 6/4403* (2013.01); *G02B 6/443* (2013.01); *G02B 6/449* (2013.01); *G02B 6/4413* (2013.01)

(58) Field of Classification Search
CPC .. G02B 6/4434; G02B 6/4403; G02B 6/4413; G02B 6/443; G02B 6/449
(Continued)

(56) References Cited

U.S. PATENT DOCUMENTS

| 10,948,674 B2 | 3/2021 | Bookbinder et al. |
| 2002/0076179 A1 | 6/2002 | Hardwick et al. |

(Continued)

FOREIGN PATENT DOCUMENTS

| AU | 2016321486 A1 | 4/2017 |
| CN | 108603991 A | 9/2018 |

(Continued)

OTHER PUBLICATIONS

International Search Report issued in PCT Patent Appl. No. PCT/JP2019/050575 dated Feb. 25, 2020.
(Continued)

*Primary Examiner* — Jerry M Blevins
(74) *Attorney, Agent, or Firm* — Marshall, Gerstein & Borun LLP

(57) ABSTRACT

A jacket is provided to the outer circumference of a cable core, a rip cord, and a tension member. The cable core, the rip cord, and the tension member are collectively covered by the jacket. A wrapping tape is longitudinally placed on the outer circumference of a core part so as to be wound therearound. Thus, immediately after the wrapping tape is longitudinally placed and wound, a wrap part thereof is formed so as to lie substantially straight in the axial direction of an optical fiber cable. In contrast, in an optical fiber cable, the cable core is obtained by combining and intertwining the core part and the wrapping tape. Because of this configuration, the wrap part of the wrapping tape is helically disposed in the longitudinal direction.

7 Claims, 6 Drawing Sheets

(58) Field of Classification Search
 USPC .......................................................... 385/103
 See application file for complete search history.

(56) References Cited

U.S. PATENT DOCUMENTS

| | | | |
|---|---|---|---|
| 2002/0141713 | A1 | 10/2002 | Okada et al. |
| 2015/0355430 | A1 | 12/2015 | Clampitt et al. |
| 2017/0293097 | A1* | 10/2017 | Ito .......................... G02B 6/44 |
| 2019/0064462 | A1 | 2/2019 | Okada et al. |
| 2019/0384027 | A1* | 12/2019 | Hoshino .............. G02B 6/4429 |
| 2020/0041739 | A1 | 2/2020 | Sato et al. |

FOREIGN PATENT DOCUMENTS

| | | | |
|---|---|---|---|
| EP | 3282295 | A1 | 2/2018 |
| EP | 3198319 | B1 | 5/2019 |
| EP | 3598190 | A1 | 1/2020 |
| JP | S52-141237 | A | 11/1977 |
| JP | H6-250058 | A | 9/1994 |
| JP | H10231064 | A | 9/1998 |
| JP | 2001-124965 | A | 5/2001 |
| JP | 2002-286980 | A | 10/2002 |
| JP | 2002-303770 | A | 10/2002 |
| JP | 2002-328278 | A | 11/2002 |
| JP | 3681616 | B2 | 8/2005 |
| JP | 2013-195744 | A | 9/2013 |
| JP | 2014016529 | A | 1/2014 |
| JP | 2016-206350 | A | 12/2016 |
| JP | 2017-58593 | A | 3/2017 |
| JP | 2017187691 | A | 10/2017 |
| TW | I485456 | B | 5/2015 |
| WO | WO-2016/189922 | A1 | 12/2016 |
| WO | WO-2018/168755 | A1 | 9/2018 |
| WO | WO-2018174004 | A1 | 9/2018 |

OTHER PUBLICATIONS

Notification of Examination Opinion issued in Taiwan Patent Application No. 108148631 dated Dec. 7, 2020.
Communication pursuant to Rule 114(2) EPC issued in European Patent Application No. 19909236.2 dated May 27, 2022.
Office Action issued in European Patent Application No. 19909236.2 dated May 27, 2022.
Examination Report issued in Indian Patent Application No. 202147032597 dated Mar. 17, 2022.
Notice of Reasons for Refusal issued in Japanese Patent Application 2019-002427 dated Apr. 28, 2022.
Extended European Search Report issued in European Application No. 19909236.2 dated Sep. 7, 2022.
Office Action issued in Japanese Application No. 2019-002427 dated Sep. 6, 2022.

* cited by examiner

OPTICAL FIBER CABLE AND CABLE CORE PRODUCTION METHOD

TECHNICAL FIELD

The present invention relates to an optical fiber cable accommodating a plurality of optical fibers, and to a method for producing a cable core of the optical fiber cable.

BACKGROUND

Due to a growing amount of information in recent years, there is a demand for an optical cable to accommodate more optical fibers with high density so that the amount of information transmitted per optical fiber cable can be increased. Accordingly, various types of optical fiber cables have been proposed.

As such the optical fiber cable, a central core optical fiber cable including an outer jacket provided on an outer circumference of a plurality of optical fiber units with tension members buried in the outer jacket has been proposed (Japanese Unexamined Patent Application Publication No. 2016-206350 (JP-A-2016-206350), for example).

Since a central core optical fiber cable uses no hard slotted rod, to protect optical fibers inside, a wrapping tape is wound around an outer circumference of the bundled optical fibers (hereinafter, simply called as a core part). Here, a helical winding and a longitudinal winding may be considered as ways to wind the wrapping tape around the outer circumference of the core part. In common optical fiber cables, the wrapping tape is wound using the longitudinal winding. This is because the wrapping tape is wound directly around the outer circumference of the optical fibers, and, if the wrapping tape is wound helically, tension of the wrapping tape presses the optical fibers, which may cause an increase in transmission loss and the like.

When the wrapping tape is longitudinally placed and wound, a wrap part is formed at a part of the wrapping tape to cover the core part entirely, and then a linear body such as a string is wound around the outer circumference of the wrapping tape to stop the wrap part from opening up. At this time, the linear body winds helically around the outer circumference of the wrapping tape, and thus the linear body presses the wrap part of the wrapping tape at predetermined intervals.

However, parts of the wrap part that are not pressed by the linear body may easily open up because of restoring force of the wrapping tape, causing the core part inside to be exposed. However, reducing a winding pitch of the linear body to solve this issue requires lowering a linear speed at the time of production, which deteriorates its manufacturability.

Also, although increasing a wrapping margin of the wrap part may prevent the core part from being exposed, a lifted part of the wrap part, if there is any, may be caught by a chip that is passed through when placing the outer jacket. This requires to increase the size of the chip more than necessary and to make the cable thicker. Also, making the wrap part larger increases an amount of material used for the wrapping tape, causing an increase in cost, and, furthermore, this makes it harder to take out the optical fibers inside.

The present invention was made in view of such problems. Its object is to provide an optical fiber cable and a method for producing the optical fiber cable that can suppress transmission loss of optical fibers while maintaining excellent workability when taking out the optical fibers.

SUMMARY OF THE DISCLOSURE

To achieve the above object, a first aspect of the present invention is an optical fiber cable including a cable core, a tension member that is disposed outside the cable core, and a jacket that is provided on an outer circumference of the cable core and the tension member. The cable core includes a core part, which is formed of a plurality of optical fibers, and a wrapping tape, which is longitudinally wound around an outer circumference of the core part. The core part and the wrapping tape of the cable core are twisted in the same direction at substantially the same pitch, and a wrap part of the wrapping tape is disposed helically to a longitudinal direction of the cable core.

It is preferable that a twisting pitch of the cable core is between 250 mm and 1200 mm, and more preferably between 300 mm and 1000 mm.

The optical fiber may be an intermittently bonded optical fiber ribbon.

A linear body may be wound helically around an outer circumference of the wrapping tape, and a twisting direction of the cable core may be opposite to a winding direction of the linear body.

The core part may be formed by assembling a plurality of optical fiber units, each of which includes a plurality of the optical fibers, and the optical fibers inside the optical fiber unit may be twisted with a pitch that is smaller than the twisting pitch of the cable core.

According to the first aspect of the invention, the cable core that is longitudinally wound by the wrapping tape is collectively twisted with the core part inside, and thus the wrap part of the wrapping tape is disposed helically to the longitudinal direction. This can prevent opening of the wrap part. At this time, the wrapping tape is wound longitudinally, not helically, and thus the wrapping tape never excessively tightens the optical fibers inside when being wound around.

For example, when the jacket is torn apart to take the optical fibers out of the optical fiber cable, the opening of the wrapping tape is suppressed and thus it is possible to prevent the optical fibers inside from popping out unintentionally. Also, there is no need to make the wrap part larger. This can reduce an amount of a material used for the wrapping tape, and also can prevent being caught by a chip of an outer-jacket extruder during manufacture, which results in an excellent manufacturability.

On the other hand, with the wrap part being in a helical shape, it is difficult to open up the wrap part to take out the optical fibers inside. However, in the present invention, since the core part inside and the wrapping tape are twisted collectively with the same pitch, it is easy to untwist the wrap part to be straight within a predetermined range of an operating part. Thus, it is possible to easily open the wrap part and take out the optical fibers inside.

In particular, if the twisting pitch of the cable core is between 250 mm and 1200 mm, it is possible to suppress the transmission loss of the optical fibers inside while keeping the above effects. It is furthermore effective if the twisting pitch of the cable core is between 300 mm and 1000 mm.

Also, if the optical fibers inside are intermittently bonded optical fiber ribbons, handling of the optical fibers is easy.

Also, winding the linear body helically around the outer circumference of the wrapping tape in a direction opposite to the twisting direction of the cable core can prevent opening of the wrapping tape with more certainty.

Also, if the core part is formed by assembling a plurality of the optical fiber units including the plurality of the optical fibers, the assembled optical fiber units and the wrapping tape are to be twisted collectively, and thus it is unnecessary to twist the optical fiber units together. Thus, when assembling the optical fiber units, there is no need to twist and assemble the plurality of the optical fiber units by rotating the supplying positions of the supplying bobbins for the optical fiber units. This enables to fix the installing positions of the supplying bobbins for the optical fiber units and allows a use of larger bobbins, which can improve production efficiency.

In such the case, when forming the optical fiber units, the optical fibers inside the fiber unit may be twisted together with a pitch that is smaller than the twisting pitch of the cable core. This can suppress an increase in transmission loss even when the optical fiber cable is bent.

A second aspect of the present invention is a cable core production method including forming a core part by assembling a plurality of optical fibers together, winding a wrapping tape longitudinally around an outer circumference of the core part, and winding up and twisting the core part and the wrapping tape collectively by rotating a winding-up side with a travelling direction of an optical fiber cable as an axis of rotation.

According to the second aspect of the invention, the wrapping tape is wound longitudinally, and thus the optical fibers inside are never tightened excessively. Also, the wrap part can be formed helically, which can prevent opening of the wrap part of the wrapping tape.

The present invention can provide an optical fiber cable and a method for producing the optical fiber cable that can suppress transmission loss of optical fibers while maintaining excellent workability when taking out the optical fibers.

DETAILED DESCRIPTION

Figure 1:
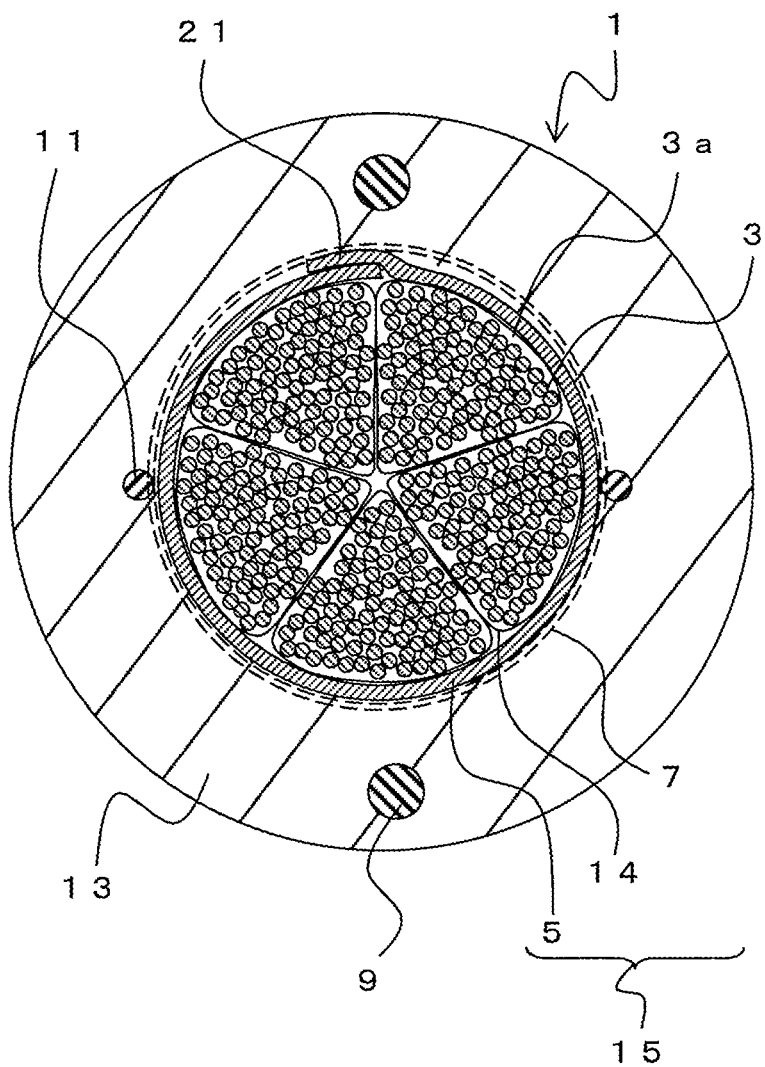
FIG. 1 is a cross sectional view showing an optical fiber cable 1.

Hereinafter, some embodiments of the present invention will be described with reference to the accompanying drawings. FIG. 1 is a view showing an optical fiber cable 1. The optical fiber cable 1 is a central core optical fiber cable, which does not use a slotted rod, including a core part 14, a wrapping tape 5, a linear body 7, a tension member 9, a rip cord 11, a jacket 13, and so on.

The core part 14 includes a plurality of optical fibers 3. In more detail, the plurality of the optical fibers 3 are twisted together to form an optical fiber unit 3a, and then the plurality of the optical fiber units 3a are assembled together forming the core part 14. The optical fiber unit 3a is bundled with a bundling material, for example, to be separated from the other optical fiber units 3a. For example, the illustrated example shows that five of the optical fiber units 3a are assembled together.

The number of the optical fiber units 3a is not limited to the example shown in the illustration. Also, the plurality of the optical fibers 3 may not be divided into the optical fiber units 3a. In the descriptions hereinafter, examples in which the plurality of the optical fiber units 3a form the core part 14 will be described.

The optical fiber 3 may be a single core optical fiber or, more preferably, an optical fiber ribbon in which a plurality of optical fibers are provided side by side. In such the case, it is preferable that the optical fiber ribbon is an intermittently bonded optical fiber ribbon in which adjacent optical fibers are bonded intermittently along its longitudinal direction.

Figure 2:
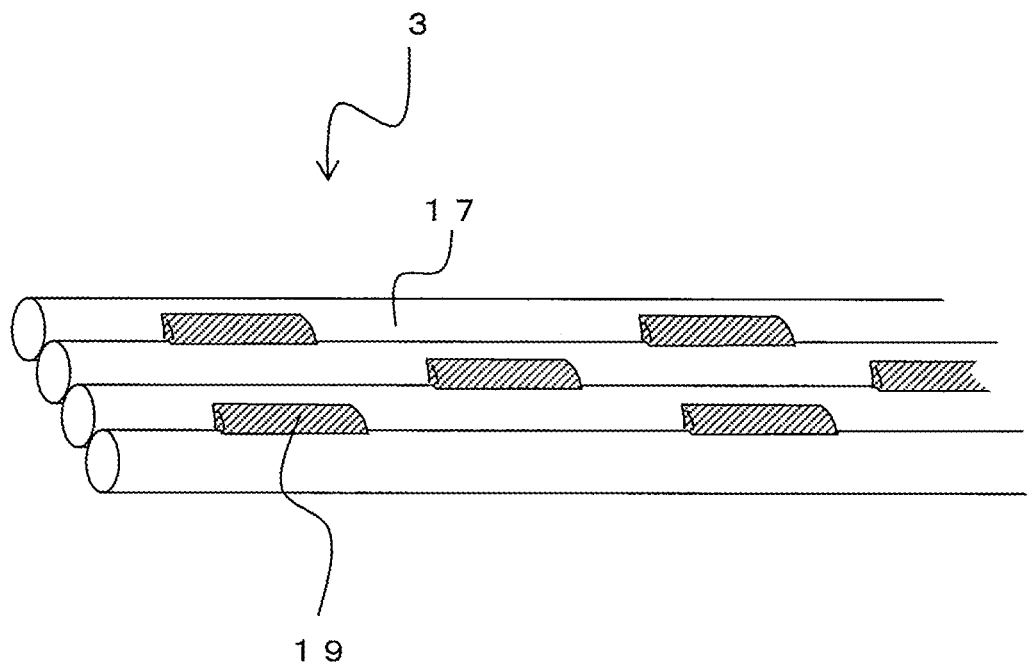
FIG. 2 is a view showing an intermittently bonded optical fiber ribbon.

FIG. 2 is a schematic view showing the optical fiber 3, which is an intermittently bonded optical fiber ribbon. The optical fiber 3 includes a plurality of bare optical fibers 17 that are bonded to each other in parallel. Although the illustration shows an example of the optical fiber 3 including the four bare optical fibers 17, the present invention is not limited thereto and any types of optical fiber 3 including the plurality of the bare optical fibers 17 are applicable.

The adjacent bare optical fibers 17 are intermittently bonded by bonding materials 19 at predetermined intervals along a longitudinal direction of the bare optical fibers 17. The bonding materials 19 are disposed being staggered in regard to the longitudinal direction of the optical fiber 3. That is, bonding parts between the adjacent bare optical fibers 17 are staggered in regard to the longitudinal direction of the optical fiber 3.

The wrapping tape 5 is provided on an outer circumference of the core part 14. The wrapping tape 5 is disposed and wound longitudinally so as to cover the plurality of the optical fiber units 3a collectively. The wrapping tape 5 is wound around with their end parts overlapping with each other, forming a wrap part 21. Here, the wrapping tape 5 wound around the outer circumference of the core part 14 forms a cable core 15. A resin tape or water-absorbent non-woven cloth can be used as the wrapping tape 5, for example. Also, the linear body 7, which is shown as a dotted line in the drawing, is helically wound around the outer circumference of the wrapping tape 5. The linear body 7 may be formed of one body or of two or more bodies.

A pair of the tension members 9 are provided outside the cable core 15 at positions facing each other, interposing the cable core 15. The tension member 9 is a steel wire, for example. Also, the rip cords 11 facing each other and interposing the cable core 15 are provided in a direction substantially perpendicular to the facing direction of the tension members 9.

Also, the jacket 13 is provided on the outer circumference of the cable core 15, the rip cords 11, and the tension members 9. The jacket 13 is a layer for covering and protecting the optical fiber cable 1. The jacket 13 collectively covers the cable core 15, the rip cords 11, and the tension members 9. That is, the tension members 9 and the rip cords 11 are buried in the jacket 13.

Here, as mentioned above, the wrapping tape 5 is placed and wound longitudinally around the outer circumference of the core part 14. Thus, immediately after placing and winding the wrapping tape 5 longitudinally, the wrap part 21 of the wrapping tape 5 is formed substantially straight to an axial direction of the optical fiber cable 1. However, in the optical fiber cable 1, the core part 14 and the wrapping tape 5 of the cable core 15 are twisted collectively after the wrapping tape 5 is wound around longitudinally. Accordingly, the core part 14 and the wrapping tape 5 are twisted in a same direction at a substantially same pitch, and the wrap part 21 of the wrapping tape 5 is disposed helically to the longitudinal direction of the optical fiber cable 1.

Figure 3:
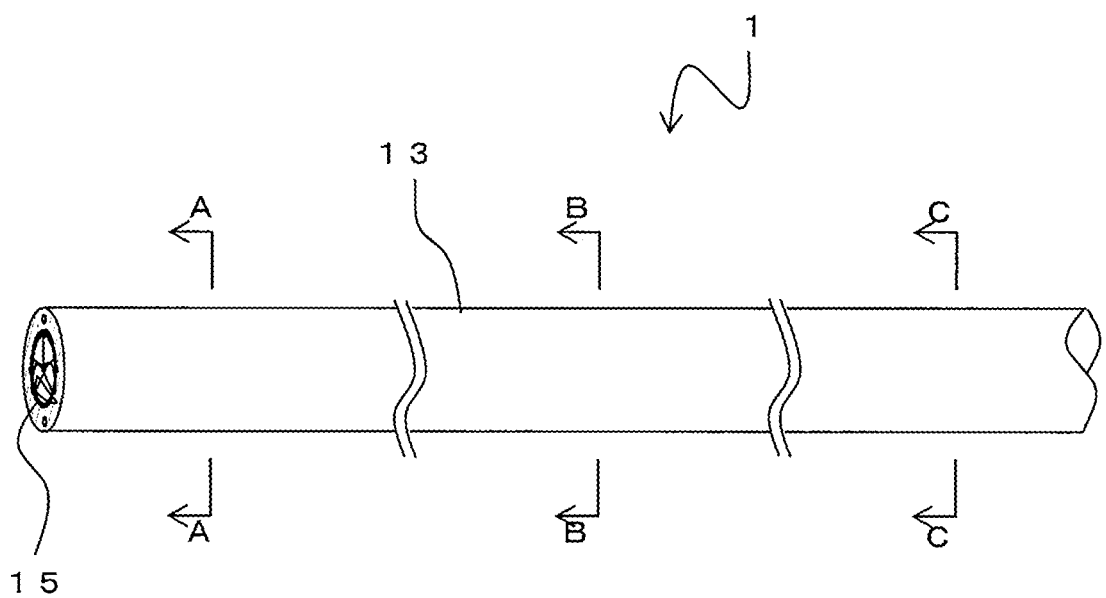
FIG. 3 is a perspective view showing the optical fiber cable 1.
Figure 4A:
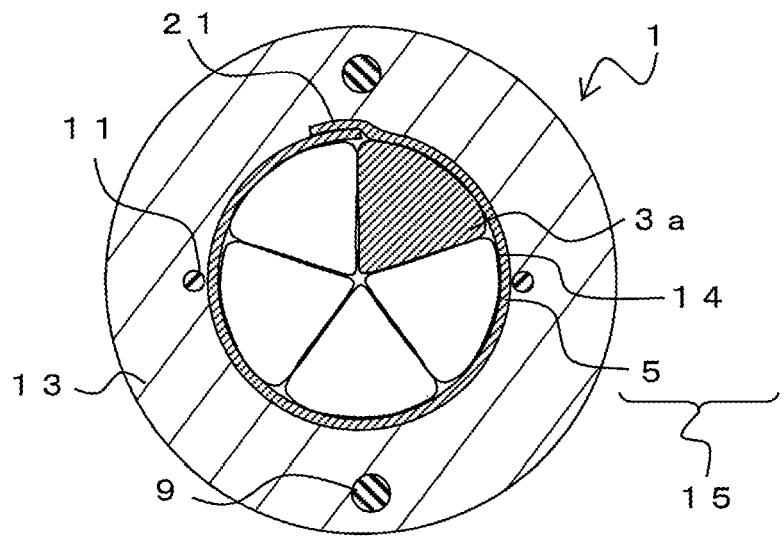
FIG. 4A is a cross sectional view taken along A-A line in FIG. 3.
Figure 4B:
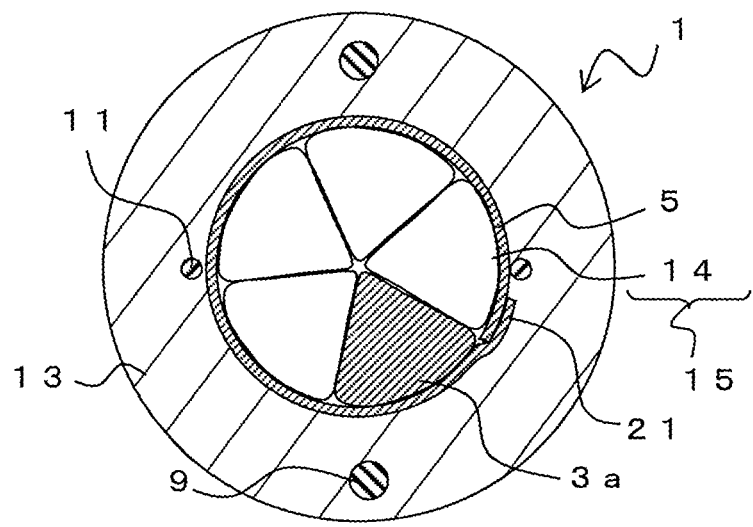
FIG. 4B is a cross sectional view taken along B-B line in FIG. 3.
Figure 4C:
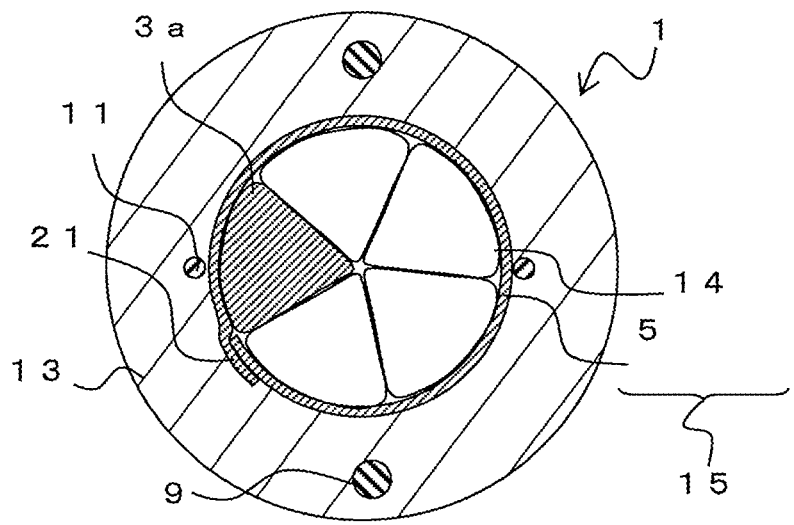
FIG. 4C is a cross sectional view taken along C-C line in FIG. 3.

FIG. 3 is a perspective view of the optical fiber cable 1. FIG. 4A is a cross sectional view taken along A-A line in FIG. 3, FIG. 4B is a cross sectional view taken along B-B line in FIG. 3, and FIG. 4C is a cross sectional view taken along C-C line in FIG. 3. For simplification, illustrations of the optical fibers are omitted and only outlines of the optical fiber units 3a will be shown in the drawings hereinafter. Also, in FIG. 4A to FIG. 4C, the particular optical fiber unit 3a will be marked by hatching.

As shown in FIG. 4A to FIG. 4C, taking positions of the tension members 9 that are disposed substantially straight to the axial direction of the optical fiber cable 1 as a point of reference, the wrap part 21 is disposed at different positions of the circumference direction depending on positions of the longitudinal direction of the optical fiber cable 1. That is, the wrap part 21 of the wrapping tape 5 is disposed helically to the longitudinal direction of the optical fiber cable 1. At this time, like the wrap part 21, the position of the optical fiber unit 3a changes along the longitudinal direction of the optical fiber cable 1.

When the wrapping tape 5 is wound around the core part 14, the optical fiber units 3a are assembled together without twisting the core part 14, and thus each of the optical fiber units 3a is disposed straight. For this reason, immediately after the wrapping tape 5 is wound around, the wrap part 21 as well as each of the optical fiber units 3a are disposed straight. Twisting the cable core 15 immediately after placing and winding the wrapping tape 5 longitudinally makes positions of the wrap part 21 and the optical fiber units 3a to be twisted in the same way so that the wrap part 21 and the optical fiber units 3a are disposed helically in regard to the longitudinal direction of the optical fiber cable 1 without changing a relative position between the wrap part 21 and the optical fiber units 3a.

As mentioned above, the optical fibers 3 inside the optical fiber unit 3a may be twisted together. In such the case, the optical fibers 3 in the optical fiber unit 3a are preferably twisted together with a twisting pitch that is smaller than that of the cable core 15. That is, the twisting pitch of the cable core 15 is preferably a long pitch.

The twisting pitch of the cable core 15 is preferably between 250 mm and 1200 mm, for example, and more preferably between 300 mm and 1000 mm. If the twisting pitch of the cable core 15 is too small, the optical fibers 3 will be twisted excessively and this may lead to an increase in transmission loss. On the other hand, if the twisting pitch of the cable core 15 is too large, twisting effects of the cable core 15 cannot be obtained.

Figure 5:
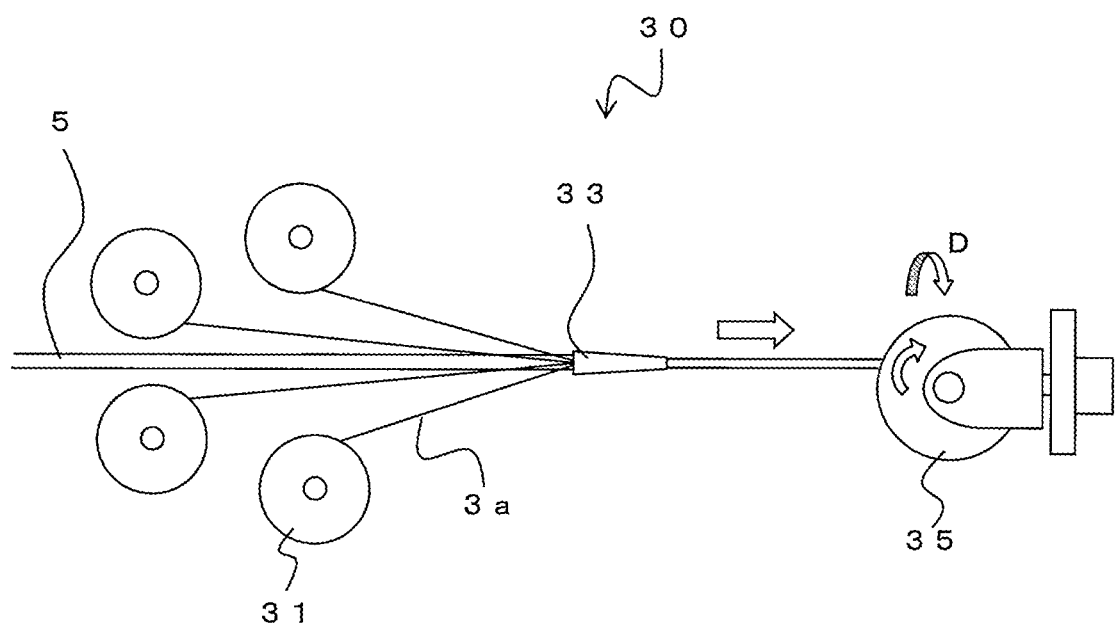
FIG. 5 is a view showing a cable core production device 30.

Next, a method for producing the cable core 15 will be described. FIG. 5 is a schematic view showing a cable core production device 30. First, a plurality of the optical fibers 3 are twisted together and a bundling material is wound therearound to form the optical fiber unit 3a. The optical fiber unit 3a is then wound around an optical-fiber-unit supplying bobbin 31. The plurality of the optical-fiber-unit supplying bobbins 31 supply the optical fiber units 3a, which are then assembled. That is, the plurality of the optical fibers 3 are assembled together to form the core part 14. At this time, the plurality of the optical fiber units 3a are assembled straight without being twisted, and thus the optical-fiber-unit supplying bobbins 31 are fixed at their installing positions.

Figure 6A:
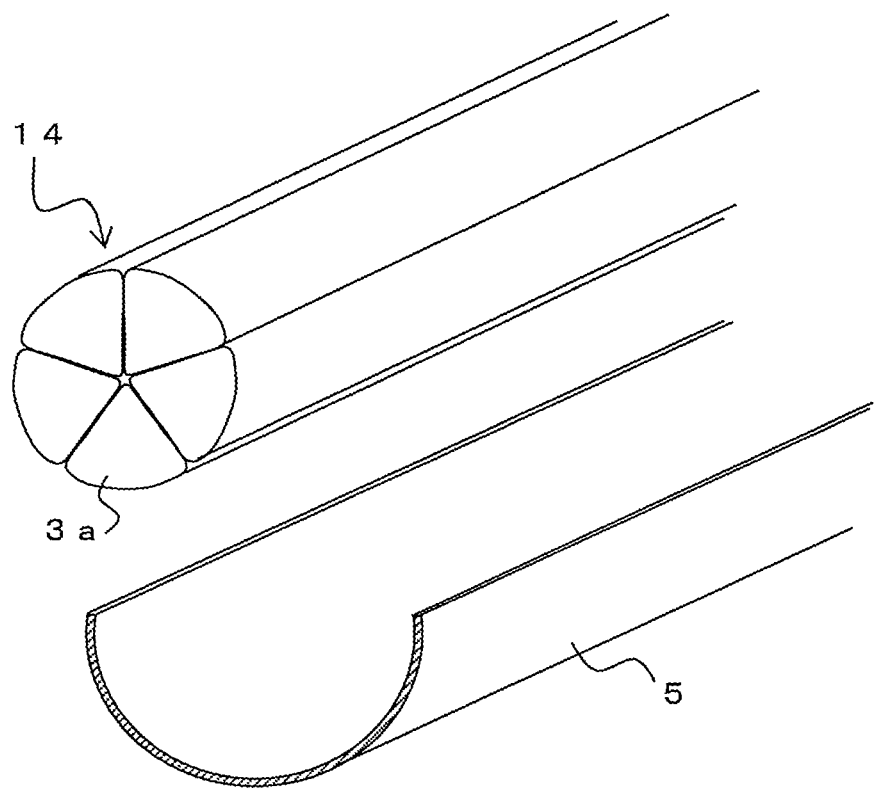
FIG. 6A, 6B are views showing steps of longitudinally placing and winding a wrapping tape 5.
Figure 6B:
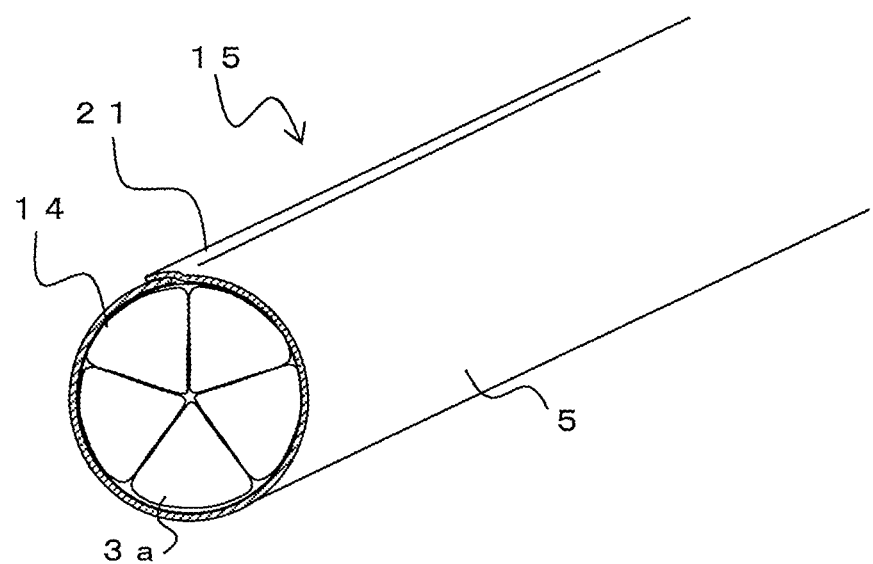

The core part 14 and the wrapping tape 5 are then provided together into a forming device 33. The forming device 33 places and winds the wrapping tape 5 around the outer circumference of the core part 14 so as to collectively cover the plurality of the optical fiber units 3a (the core part 14). FIG. 6A and FIG. 6B are schematic views showing steps of longitudinally winding the wrapping tape 5 around the core part 14. As mentioned above, the optical fiber units 3a are assembled together straight along the longitudinal direction within the core part 14, and the wrap part 21 of the wrapping tape 5 is also disposed straight along the longitudinal direction after longitudinal winding thereof.

As shown in FIG. 5, after exiting the forming device 33, the cable core 15 is then wound up by a winding bobbin 35. At this time, the winding bobbin 35 can rotate with a travelling direction of the optical fiber cable as an axis of rotation (a direction shown with an arrow D in the drawing). Winding up the cable core 15 while rotating the winding bobbin 35 on a winding side can wind up and twist the core part 14 and the wrapping tape 5 collectively.

Figure 7A:
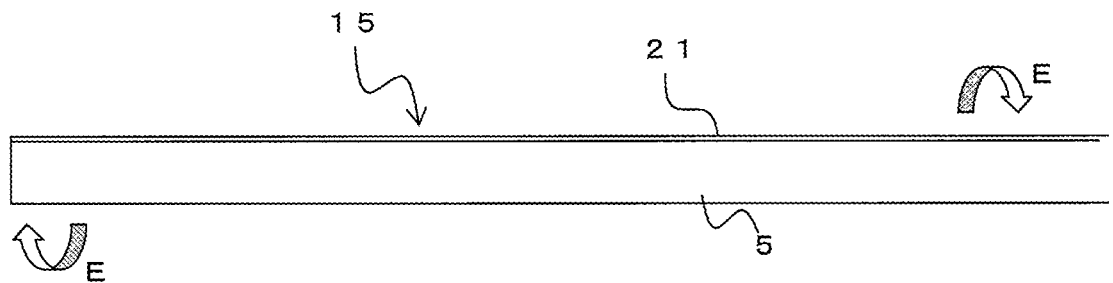
FIG. 7A-7C are views showing steps of twisting a cable core 15 and winding a linear body 7 around the cable core 15.
Figure 7B:
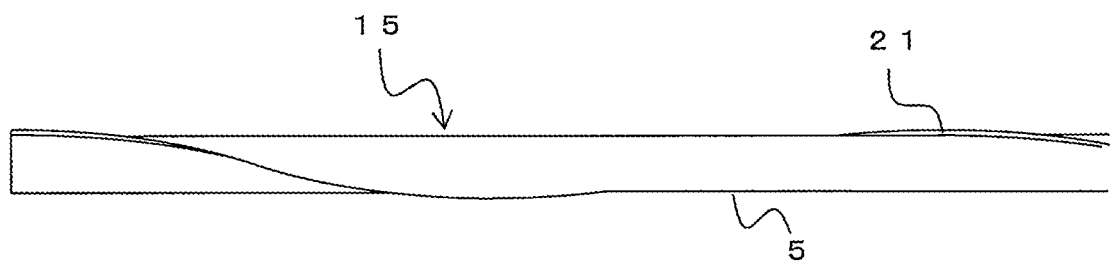
Figure 7C:
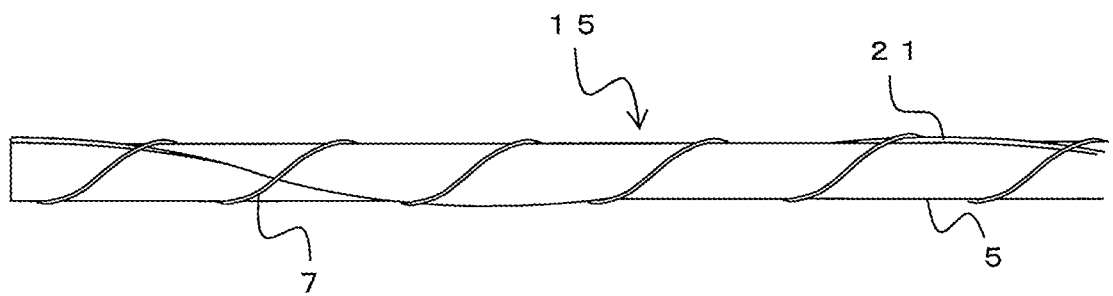

FIG. 7A to FIG. 7C are schematic views showing detailed steps in which the wrapping tape 5 is longitudinally wound around and wound up by the winding bobbin 35. FIG. 7A is a view showing a state immediately after the wrapping tape 5 is longitudinally wound around the outer circumference of the core part 14. As mentioned above, the wrap part 21 of the wrapping tape 5 after longitudinal winding is disposed straight along the longitudinal direction.

When the cable core 15 is twisted from this state (in a direction E shown in FIG. 7A), the core part 14 and the wrapping tape 5 are twisted collectively as shown in FIG. 7B and the wrap part 21 is disposed helically. This helical arrangement of the wrap part 21 can prevent the wrap part 21 from opening up and exposing the core part 14 inside.

After this, as shown in FIG. 7C, the linear body 7 is helically wound around the outer circumference of the cable core 15 as necessary, and the cable core 15 is then wound up by the winding bobbin 35. As above, the core part 14 and the wrapping tape 5 are twisted collectively and the cable core 15, in which the wrap part of the wrapping tape 5 is disposed helically in regard to the longitudinal direction, can be obtained.

When winding the linear body 7, it is preferable that the twisting direction of the cable core 15 is opposite to a helical winding direction of the linear body 7. This can press the wrap part 21 efficiently without changing the pitch of the linear body 7 winding around the cable core 15.

Then, the cable core 15 that is wound up by the winding bobbin 35 is supplied together with the tension members 9 and the rip cords 11 to an outer-jacket extruding machine, and the jacket 13 is extruded to cover the outer circumference of the cable core 15. As above, the optical fiber cable 1 is produced.

According to the optical fiber cable 1 of the present embodiment, the wrapping tape 5 is longitudinally wound and thus the optical fibers 3 inside are not excessively tightened, preventing an increase in transmission loss. Also, the cable core 15 is twisted, and this can prevent the optical fibers 3 inside from popping out unintentionally from the wrap part 21 when tearing the jacket 13 and cutting the linear body 7 during splicing operation, for example.

In particular, setting the twisting pitch of the cable core 15 within an appropriate range can prevent an increase in transmission loss and more effectively prevent exposure or the like of the core part 14.

Also, since the core part 14 and the wrapping tape 5 of the cable core 15 are twisted collectively, the cable core 15 can be easily untwisted to make the wrap part 21 substantially straight within a range in which the jacket 13 and the like are torn up. Thus, the optical fibers 3 inside can be taken out easily.

Also, by rotating the winding bobbin 35 at the rear side of the forming device 33 with the travelling direction of the cable core 15 as the axis of rotation, the core part 14 and the wrapping tape 5 can be easily and collectively twisted together.

The cable core is then wound up by a winding bobbin using a winding device that can wind up while rotating in a flowing direction of the cable core as an axis of rotation. The twisting pitch of the cable core is changed by changing the balance between winding speed and rotating speed of the winding machine.

The cable core made as above, tension members using steel wires of 1.4 mm diameter, and rip cords for tearing a jacket are supplied to an outer-jacket extruding machine to be covered by a cylindrical jacket extruded from the machine, forming an optical fiber cable. A material used for the jacket is LLDPE. Test pieces for each of the cable cores having different twisting pitches are prepared for different amount of wrap of the wrapping tape and different pitches of the binding string, and their properties are evaluated. The results are shown in Table

TABLE 1

| | | No.1 | No. 2 | No. 3 | No. 4 | No. 5 | No. 6 |
|---|---|---|---|---|---|---|---|
| Cable Core Twisting Pitch(mm) | | 200 | 250 | 300 | 1000 | 1200 | 1400 |
| Transmission Loss at Wavelength 1550 nm | 0.25 dB/km or less | bad | bad | good | good | good | good |
| | 0.30 dB/km or less | bad | good | good | good | good | good |
| Core Part Exposure at Wrap Part | Wrap Width: 5 mm Binding String Pitch: 50 mm | good | good | good | good | bad | bad |
| | Wrap Width: 5 mm Binding String Pitch: 30 mm | good | good | good | good | good | bad |
| | Wrap Width: 10 mm Binding String Pitch: 50 mm | good | good | good | good | good | good |
| Caught by Chip of Outer-Jacket Extruder Wrap Width: 5 mm Binding String Pitch: 30 mm | Chip Diameter: Cable Core Outer Diameter + 0.5 mm | good | good | good | good | good | bad |
| | Chip Diameter: Cable Core Outer Diameter + 1.0 mm | good | good | good | good | good | good |

The cross sectional structure of the optical fiber cable 1 of the present invention is not limited to the shape shown in FIG. 1. For example, the optical fiber cable 1 may be a self-supporting optical fiber cable having a supporting wire part.

WORKING EXAMPLES

Transmission loss and opening (exposure of the core part 14) are evaluated with the various twisting pitch of the cable core 15. The optical fiber cable shown in FIG. 1 is used for the evaluation.

Eight optical fibers each having a diameter of 250 μm are bonded with each other intermittently to form an eight-core intermittently bonded optical fiber ribbon. Then, ten of the eight-core intermittently bonded optical fiber ribbons are twisted together and a plastic tape having a 2 mm width is wound thereon to form an 80-core optical fiber unit. Five of the 80-core optical fiber units are supplied and assembled together to form a core part, a wrapping tape made of a water-absorbent non-woven cloth is supplied and rolled up by a forming tool to be wound longitudinally around the outer circumference of the core part, and a binding string made of nylon is further wound around to form a 400-core cable core. A width of the wrap part of the wrapping tape is 5 mm.

In the table, "Transmission Loss" is a transmission loss at a wavelength of 1550 nm. Those that passed for 0.25 dB or less and 0.30 dB or less, respectively, are marked as "good" and those of which the transmission loss exceeded 0.25 dB and 0.30 dB, respectively, are marked as "bad".

"Core Part Exposure at Wrap Part" for different wrap widths and binding string pitches is marked as "bad" if the core part inside (the optical fibers) is exposed when the jacket is removed, and marked as "good" if the core part is not exposed.

"Caught by Chip of Outer-Jacket Extruder" is marked as "bad" if the wrapping tape at the wrap part is caught by the chip used during extruding the jacket because of a lift due to opening of the wrap part, and marked as "good" if there is no catching by the chip. The evaluation is performed with different diameters of the chip.

For the test piece No. 1, there was no exposure of the core part from the wrap part under any conditions and there was no catching by the outer-jacket extruder chip. However, the twisting pitch of the cable core is 200 mm and short, which increases the transmission loss of the optical fibers, and resulted in the transmission loss of over 0.30 dB. In contrast, the transmission loss of the optical fibers of the test piece No. 2 with the twisting pitch of the cable core of 250 mm was, although exceeding 0.25 dB, kept 0.30 dB or less.

For both the test pieces No. 3 and No. 4 with the twisting pitch of the cable core between 300 mm and 1000 mm, there was no exposure of the core part at the wrap part and no catching by the outer-jacket-extruder chip, and their transmission loss satisfied 0.25 dB or less.

For the test piece No. 5 with the twisting pitch of the cable core of 1200 mm, there was no exposure of the core part at the wrap part under the conditions of wrap width 5 mm and binding string pitch 30 mm and under the conditions of wrap width 10 mm and binding string pitch 50 mm. However, there was an exposure of the core part at the wrap part under the conditions of wrap width 5 mm and binding string pitch 50 mm. The twisting pitch of the cable core in No. 5 is long, which results in a relatively small effect in prevention of the opening of the wrap part, and thus the preventing effect for the opening is insufficient if the wrap width is small and the binding string winding pitch is large. However, the effect can be obtained by increasing the wrap width or reducing the binding string winding pitch.

For the test piece No. 6 with the twisting pitch of the cable core of 1400 mm, there was no exposure of the core part at the wrap part under the conditions of wrap width 10 mm and binding string pitch 50 mm. However, there was an exposure of the core part at the wrap part under the conditions of wrap width 5 mm and binding string pitch 50 mm and under the conditions of wrap width 5 mm and binding string pitch 30 mm. The twisting pitch of the cable core in No. 6 is long, which results in a small effect in prevention of the opening of the wrap part, and thus the preventing effect for the opening is insufficient if the wrap width is small and the binding string winding pitch is large.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. An optical fiber cable comprising:
   a cable core;
   a tension member that is disposed outside the cable core; and
   a jacket that is provided on an outer circumference of the cable core and the tension member, the cable core including a core part, which is formed of a plurality of optical fibers, and a wrapping tape, which is longitudinally wound around an outer circumference of the core part, wherein
   the core part and the wrapping tape of the cable core are twisted in a same direction at substantially a same pitch; and
   a wrap part of the wrapping tape is disposed helically to a longitudinal direction of the cable core.

2. The optical fiber cable of claim 1, wherein a twisting pitch of the cable core is between 250 mm and 1200 mm.

3. The optical fiber cable of claim 1, wherein the twisting pitch of the cable core is between 300 mm and 1000 mm.

4. The optical fiber cable of claim 1, wherein the optical fiber is an intermittently bonded optical fiber ribbon.

5. The optical fiber cable of claim 1, wherein:
   a linear body is wound helically around an outer circumference of the wrapping tape; and
   a twisting direction of the cable core is opposite to a winding direction of the linear body.

6. The optical fiber cable of claim 1, wherein:
   the core part is formed by assembling a plurality of optical fiber units, each of which includes a plurality of the optical fibers;
   the optical fibers inside the optical fiber unit are twisted with a pitch that is smaller than the twisting pitch of the cable core.

7. A cable core production method comprising:
   forming a core part by assembling a plurality of optical fibers together;
   winding a wrapping tape longitudinally around an outer circumference of the core part; and
   winding up and twisting the core part and the wrapping tape collectively by rotating a winding-up side with a travelling direction of an optical fiber cable as an axis of rotation.

* * * * *